United States Patent [19]
Martin et al.

[11] Patent Number: 5,960,039
[45] Date of Patent: Sep. 28, 1999

[54] METHODS AND APPARATUS FOR HIGH DATA RATE TRANSMISSION IN NARROWBAND MOBILE RADIO CHANNELS

[75] Inventors: Carol Catalano Martin, Fair Haven; Jack Harriman Winters, Middletown, both of N.J.

[73] Assignee: Lucent Technologies Inc., Murray Hill, N.J.

[21] Appl. No.: 08/631,315

[22] Filed: Apr. 10, 1996

[51] Int. Cl.$^6$ ................................ H04B 7/02; H04L 1/02
[52] U.S. Cl. ......................... 375/267; 375/299; 375/347; 455/101; 455/506
[58] Field of Search .................................. 375/347, 267, 375/299, 304; 455/101, 103, 506

[56] References Cited

U.S. PATENT DOCUMENTS

| | | | |
|---|---|---|---|
| 4,715,048 | 12/1987 | Masamura | 375/347 |
| 5,289,499 | 2/1994 | Weerackody | 375/200 |
| 5,305,353 | 4/1994 | Weerackody | 375/347 |
| 5,394,435 | 2/1995 | Weerackody | 375/206 |
| 5,457,712 | 10/1995 | Weerackody | 375/347 |
| 5,689,439 | 11/1997 | Weerackody et al. | 375/295 |

OTHER PUBLICATIONS

Wei, Lee–Fang, "Coded M–DPSK with Built–In Time Diversity for Fading Channels," IEEE Transactions on Information Theory, vol. 39, No. 6, pp. 1820–1839, Nov. 1993.

Winters, Jack H., Salz, Jack, Gitlin, Richard D., "The Impact of Antenna Diversity on the Capacity of Wireless Communication Systems," IEEE Transactions on Communications, vol. 42, No. 2/3/4, pp. 1740–1751, Feb./Mar./Apr. 1994.

Winters, Jack H. "Signal Acquisition and Tracking with Adaptive Arrays in the Digital Mobile Radio System IS–54 with Flat Fading," IEEE Transactions of Vehicular Technology, pp. 377–384, Nov. 1993.

*Primary Examiner*—Chi H. Pham
*Assistant Examiner*—Bryan Webster

[57] ABSTRACT

An adaptive high speed data transmission system is described. In one aspect, the transmitter for this system employs a plurality of transmit antennas which have controllable offsets. The transmitter also includes signal coding circuitry suitable for use to address transmission impairments due to fast fading in the transmission channel. At the receiver, the received signal is analyzed to determine the fading characteristics of the channel. Where slow fading is detected, the offsets are employed to convert the slow fading into fast fading. The channel characteristics are continually resampled and these characteristics are used to adjust the transmitter and the receiver to achieve optimal transmission speed.

16 Claims, 6 Drawing Sheets

METHODS AND APPARATUS FOR HIGH DATA RATE TRANSMISSION IN NARROWBAND MOBILE RADIO CHANNELS

FIELD OF THE INVENTION

The present invention relates generally to the field of wireless data transmission and reception. More particularly, it relates to improvements allowing high data rate transmission in narrowband mobile radio channels, such as a 30 kHz wireless channel.

BACKGROUND OF THE INVENTION

In such a channel, two principle impairments are observed:

1) multipath fading which may be fast or slow depending on the movement of the receiver, and its position with respect to the transmitter and other items which might affect reception and 2) intersymbol interference ("ISI") due to delay spread. A variety of techniques, such as 1) coding, 2) equalization and 3) antenna diversity have been employed to address these problems with varying degrees of success, See, for example, Lee-Fang Wei, "Coded M-DPSK with Built-In Time Diversity for Fading Channels", IEEE Transactions on Information Theory, Vol. 39 No. 6, pp. 1820–1839, November 1993; and Jack H. Winters, Jack Salz, Richard D. Gitlin "The Impact of Antenna Diversity on the Capacity of Wireless Communication Systems", IEEE Transactions on Communications, Vol. 42 No. 2/3/4, pp. 1740–1751, February/ March/ April 1994. Both of these papers are incorporated by reference herein.

Single techniques have various drawbacks as discussed below. Coding can provide up to a 3 to 4 dB decrease in required average signal energy per information bit received from each antenna per one-sided power spectral density of an additive white Gaussian noise ("AWGN"), $E_b/N_o$, for a given bit error rate ("BER") with AWGN. With fast fading, more complex codes with interleaving can achieve diversity gain with time diversity sufficient to perhaps permit a 64 kbps rate of data transmission in a 30 kHz channel. See the Wei paper cited above. However, such complex codes add processing expense and delays and, with slow fading, as with stationary users such as mobile users in a stopped vehicle or portable users transmitting from a fixed position such as an office or home, coding alone cannot achieve diversity gain.

Equalization can eliminate ISI, while providing diversity gain when delay spread is present. More complex methods can partially suppress co-channel interference ("CCI") when delay spread is present, offering the possibility of some capacity increase through higher channel reuse.

Antenna arrays can provide diversity gain by receive diversity. Transmit diversity, the use of multiple antennas, cannot alone provide diversity gain, but when the transmit frequency of each antenna is slightly different or offset, slow fading can be converted to fast fading at the receiver. This conversion has advantages when combined with coding. See, "Orthogonal Polarization and Time Varying Offsetting of Signals for Digital Data Transmission or Reception", U.S. Ser. No. 08/159,880 filed Nov. 30, 1993 which is assigned to the assignee of the present invention and which is incorporated by reference herein.

Arrays of transmit antennas can also be employed to obtain up to M independent spatially-isolated channels in the same frequency channel between the base station and mobile. With M antennas, linear combining of signals at the receiver can suppress up to M−1 interferers, permitting M−N+1 simultaneous channels each with the same performance as a single channel with an N-fold diversity gain. See, the Winters et al. paper cited above.

Despite the existence of this known technique, a need still remains for a technique to obtain significantly higher or near maximal data rates with a minimal increase in complexity while addressing a full range of multipath fading from slow to fast.

SUMMARY OF THE INVENTION

The present invention provides methods and apparatus for advantageously obtaining significantly higher data rates while adding a modest amount of additional design complexity. In one aspect of the present invention, coding and antenna diversity are jointly used in conjunction with fading predictive feedback and suitable control processing to form an adaptive system which converts slow fading to fast fading, measures the fading in the channel and adaptively adjusts operation in response to the measured fading to achieve significantly faster data transmission rates.

In one embodiment of the invention, an array of transmit antennas and an array of receive antennas are employed. The array of transmit antennas transmit with a frequency offset between antennas to convert slow fading into fast fading at the receiver. To appropriately combine or utilize the signals received at the receive antennas, these signals must be appropriately weighted. Such weighting to be accurate requires a knowledge of the fading. In accordance with the present invention, this knowledge of the channel is gained by measuring the fading, taking advantage of the periodic nature of the induced fading. By way of example, the offsets of the transmit antennas may be stored in the the receiver and then used by a control processor to periodically measure the fading at a sample rate sufficiently fast to determine changes in the rate of slow fading. As a result, a simple and cost effective fading predictive method and apparatus is achieved.

Further features of the invention, its nature, and various advantages will be apparent from the drawings and the following detailed description of the invention.

DETAILED DESCRIPTION

Figure 1:
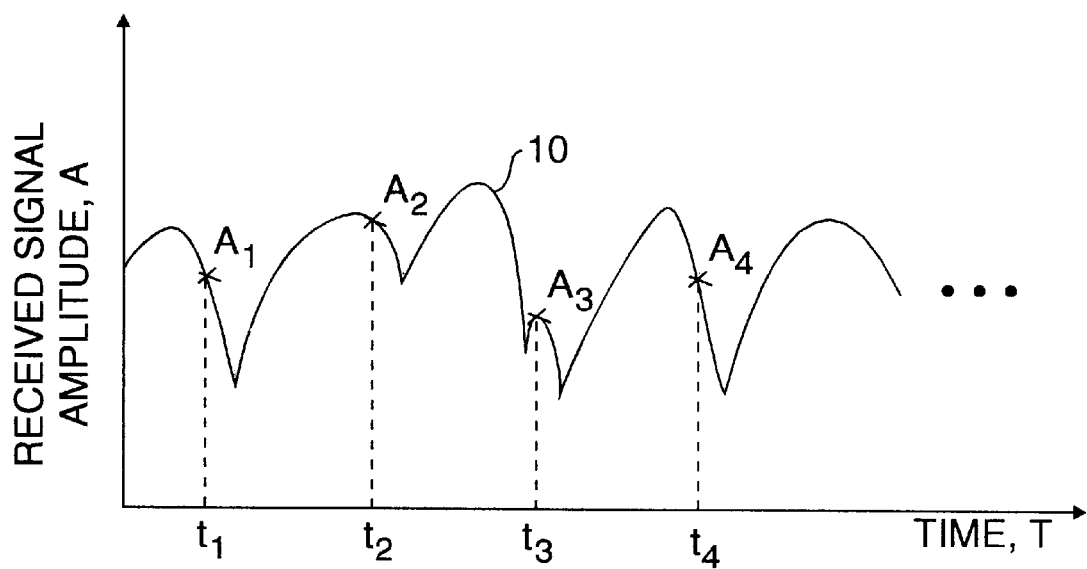
FIG. 1 graphically illustrates a random Rayleigh fast fading channel showing the amplitude of the received signal versus time for a signal transmitted across a communication channel exhibiting fast fading.
Figure 2:
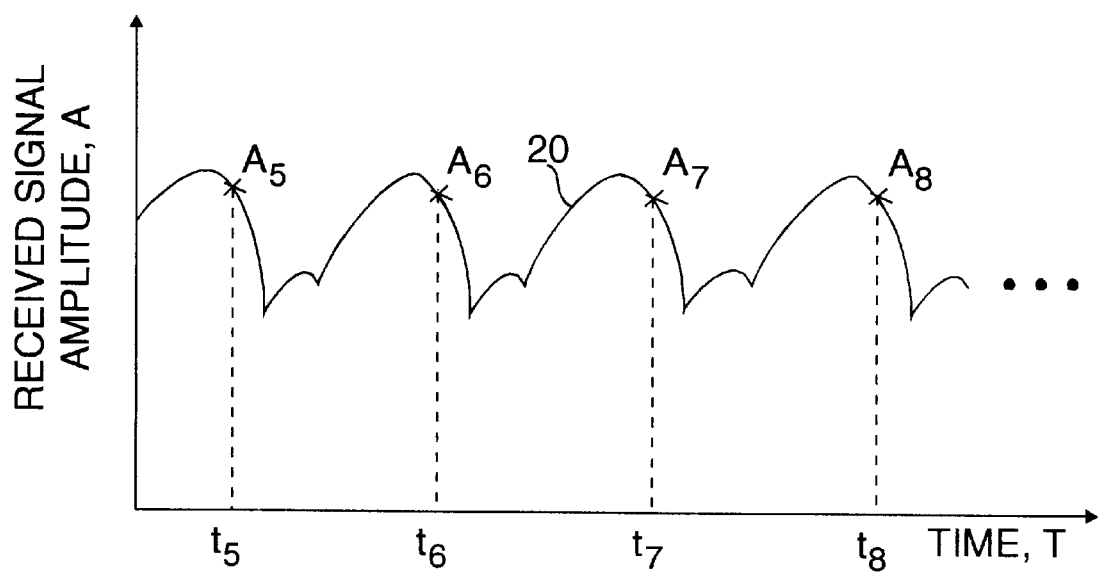
FIG. 2 is illustrative of induced periodic fast fading.

FIG. 1 illustrates a random Rayleigh fast fading channel 10. While drawn solely illustratively and not drawn to scale, it is readily observed that the channel 10, if periodically sampled at a slow rate at points $t_1$, $t_2$, $t_3$ and $t_4$, will be observed to have a different amplitude $A_1$, $A_2$, $A_3$ and $A_4$, respectively, at each sample point. To accurately sample a channel, such as channel 10, requires rapid sampling using narrow observation windows which are much faster than the fading rate, and a concomitant complexity of sample circuitry. Under such conditions, it may be difficult to generate an accurate estimate of the channel. See, e.g., Jack H. Winters, "Signal Acquisition and Tracking with Adaptive Arrays in the Digital Mobile Radio System IS-54 with Flat Fading," IEEE Transactions of Vehicular Technology, pp. 377–384, November 1993 incorporated by reference herein. By contrast, the periodic induced fast fading channel 20 shown in FIG. 2 is observed to have a constant amplitude $A_5$ at each of the periodic sample points $t_5$, $t_6$, $t_7$ and $t_8$. While FIG. 2 is an idealized representation of a fast fading channel and the measured amplitudes at points $t_5$, $t_6$, $t_7$ and $t_8$ will be expected to vary slightly as a result of noise, slow fading changes and the like, the present invention takes advantage of the known periodicity of the channel 20 as discussed further below. Such a periodic channel requires only a limited number of samples of the channel in one period to determine the channel characteristics at all times. Specifically, with M transmit antennas with offsets $f_1(t) = e^{jw_1 t}, \ldots, f_M(t) = e^{jw_M t}$, the channel characteristic between the M transmit antennas and the first receive antenna, and similarly for the other receive antennas, is given by:

$$C(t) = a_1 e^{jw_1 t} + \ldots + a_m e^{jw_m t},$$

where $a_i$ is the complex channel characteristic between the ith transmit and first receive antenna. If we obtain M samples of the channel, $$C(t_1) = a_1 e^{jw_1 t_1} + \ldots + a_M e^{jw_M t_1}$$
$$\vdots$$
$$C(t_M) = a_1 e^{jw_1 t_M} + \ldots + a_M e^{jw_M t_M}$$

then we have M complex equations and can completely determine the channel for all time. Furthermore, we can get very accurate channel measurements by using a plurality of periodic samples n at the channel repetition rate and averaging them by summing them and dividing by n. The channel is approximately the average of the measured values.

Figure 3:
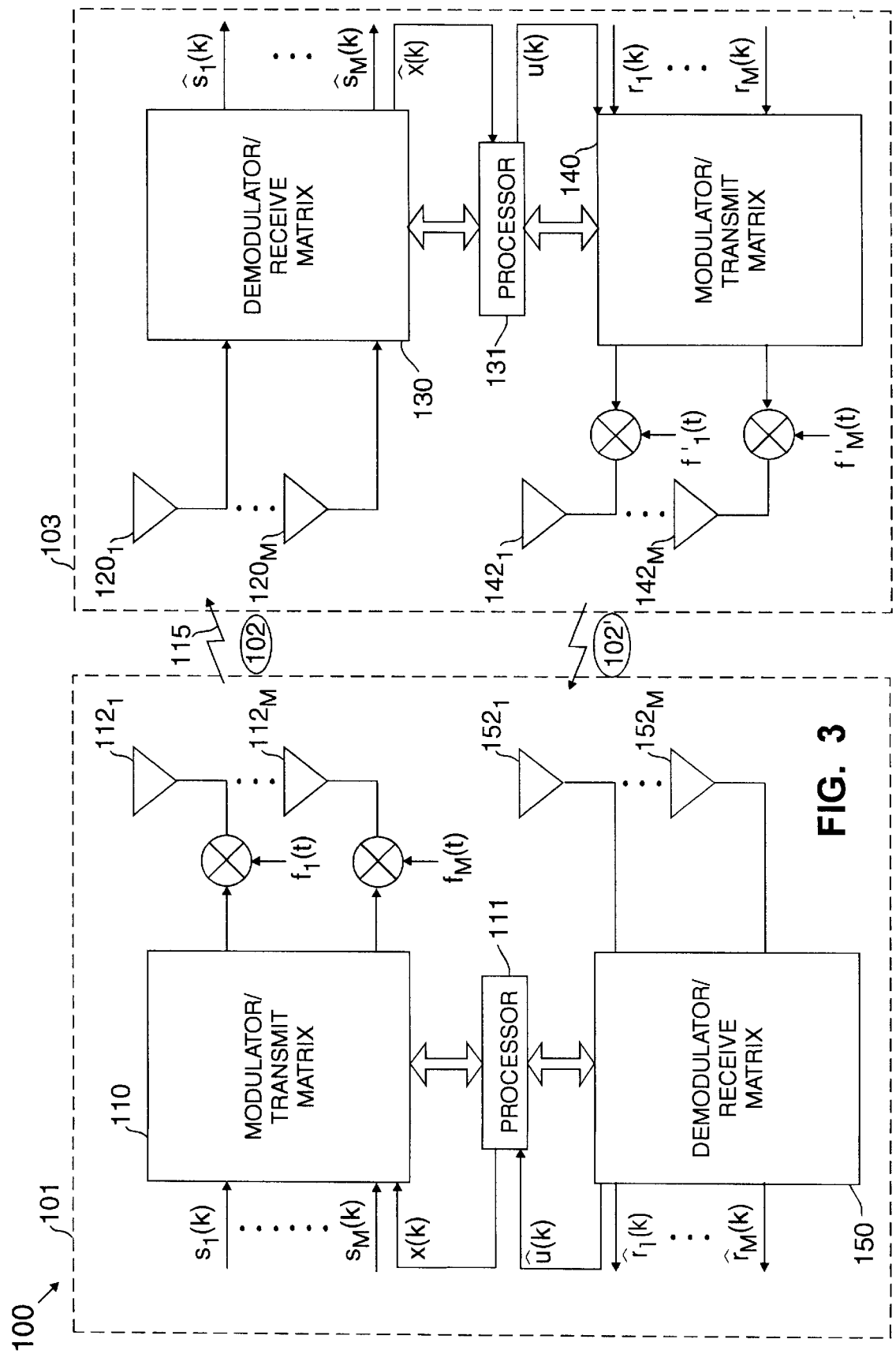
FIG. 3 is an overall block diagram of a high speed transmission system according to the present invention.

FIG. 3 illustrates in block format a system 100 in accordance with one embodiment of the present invention. System 100 includes a base station 101, a plurality of communication channels denoted 102 and 102', and a mobile or portable unit 103. While mobile and portable units may be considered two separate classes of products for some purposes, hereafter, they will be referred to jointly.

In system 100, a plurality of M signals $s_1(k) \ldots s_M(k)$ to be transmitted are input to a modulator/transmit matrix 110 which produces modulated signals to be transmitted at its outputs. The modulator/transmit matrix 110 is connected to and controlled by a processor 111 as discussed further below. The outputs of the matrix 110 are, in turn, connected to a plurality of carrier offset producing circuits $f_1(t) \ldots f_m(t)$ which add a frequency offset to each one of the signals before it is transmitted by its respective transmit antenna, $112_1 \ldots 112_m$. The offset signals are transmitted across communication channels which are represented collectively by zigzagging line 115. They are then received by receiver antennas $120_1 \ldots 120_m$ in the mobile 103. The received signals are connected to inputs of a demodulator/receiver matrix 130 which is controlled by a processor 131. The matrix 130 then provides received signals $\hat{s}_1(k) \ldots \hat{s}_m(k)$ at its outputs. As addressed further below, the matrix 130 also collects information concerning the communication channels 102 between the transmitting antennas $112_1 \ldots 112_m$ and the receiving antennas $120_1 \ldots 120_m$ and provides an output signal $\hat{x}_k$ which is fed to the processor 131.

In a presently preferred embodiment, communication channel information is also fed back to the base station processor 111 which may be suitably programmed to adaptively control the matrix 110. Such control may consist of known adjustments, such as an adjustment of the power transmitted by the antennas $112_1 \ldots 112_m$ or to make other adjustments discussed further below. To such ends, the mobile processor 131 produces an output signal u(k) which is connected to a second modulator transmit/matrix 140 located in the mobile 103. The matrix 140 is also connected to a plurality of input signals $r_1(k) \ldots r_m(k)$ to be transmitted to the base station 101. At the outputs of the matrix 140, a plurality of carrier offset producing circuits $f'_1 \ldots f'_m$ add offsets to the signals to be transmitted by portable transmit antennas $142_1 \ldots 142_m$ which transmit their respective signals across the communication channels 102' to a plurality of base station receive antennas $152_1 \ldots 152_m$. These antennas are connected to a demodulator/receiver matrix 150 which produces on its outputs received signals $\hat{r}_1(k) \ldots \hat{r}_m(k)$. The matrix 150 provides an information signal $\hat{u}(k)$ indicative of information about the communication channels 102 to the processor 111. The processor 111 also provides a signal x(k) as an input to the matrix 110. The arrays of antennas of system 100 can also be utilized to eliminate ISI through the process of nulling delayed signals in a known fashion. Optional equalization circuitry or software may be employed as part of the transmit and receive matrices 110, 130, 140 and 150.

As another alternative, while the M antennas of system 100 can provide up to an M-fold capacity increase, if it is desired to provide an M-fold capacity increase with L-fold diversity, M+L−1 antennas may suitably be employed.

In a presently preferred embodiment, linear processing provided by the processors 111 and 131 in the base station and mobile 101 and 103, respectively, is employed to adjust the data rate and transmit power of each of the m separate channels to maximize the total data transmission rate under power constraints. The feedback x(k) and u(k) concerning the channel characteristics from the receive matrices 130 and 150, respectively, is utilized for such adjustments.

Further, to obtain independent or low correlation of the fading at each receiving antenna, orthogonally-polarized antennas $120_1 \ldots 120_m$ and $152_1 \ldots 152_m$ are preferably utilized. Appropriate spatial separation is also employed. When the receiver is in a mobile, such as mobile 103, this spacing is usually just $\lambda/4$ to obtain large diversity order in a small area. For example, two dual-polarization antennas on a mobile would provide four-fold diversity and the possibility of obtaining up to a four-fold increase in capacity with four antennas at the base station as well.

Figure 3A:
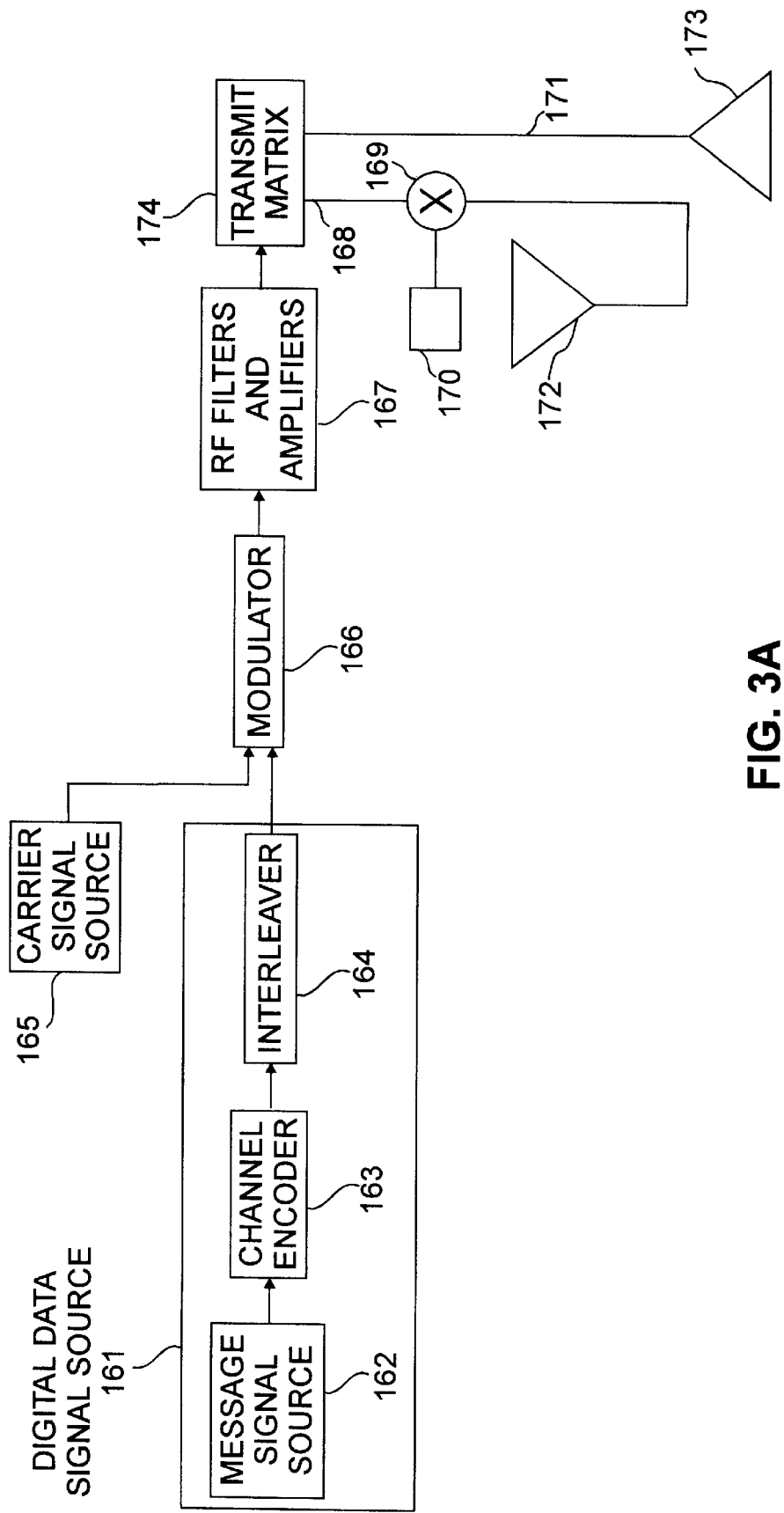
FIG. 3A is a block diagram illustrating one transmitter suitable for use in conjunction with the present invention.
Figure 3B:
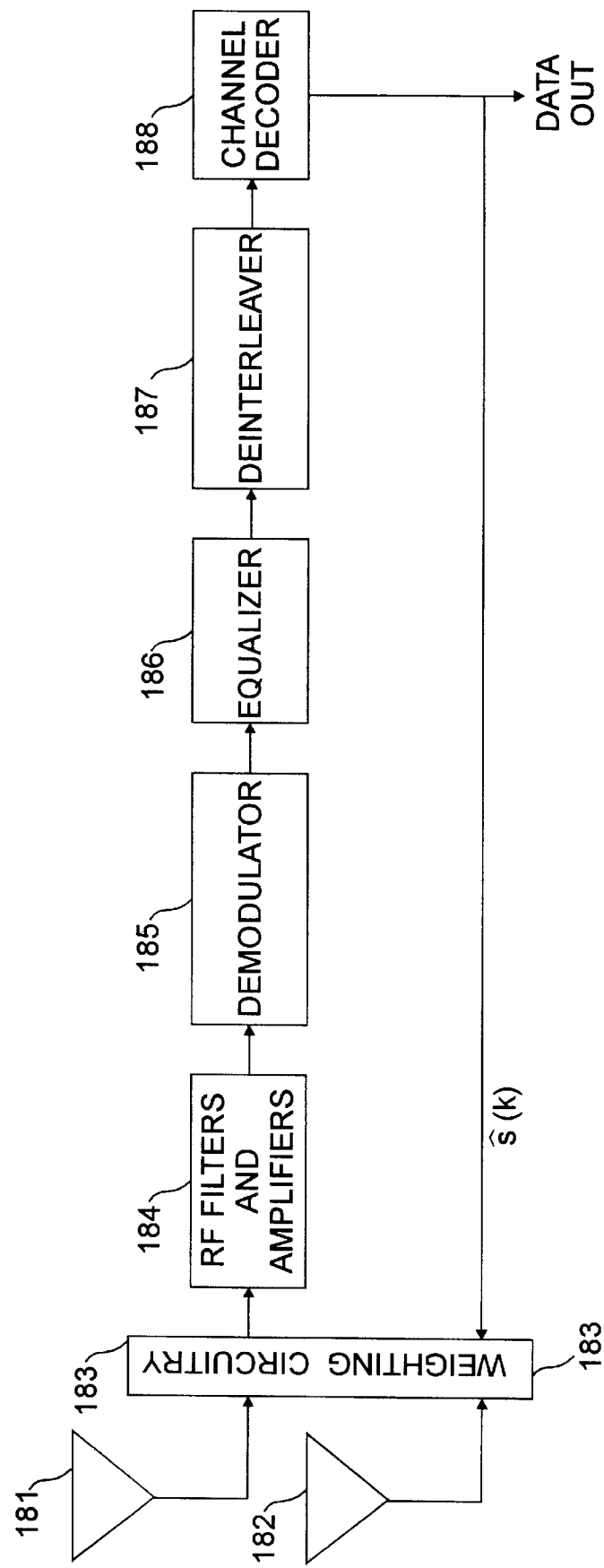
FIG. 3B is a block diagram illustrating one receiver suitable for use in conjunction with the present invention.

While the construction of suitable modulator/transmit matrices 110, 140 and demodulator/receiver matrices 130, 150 is well within the skill of one of ordinary skill in the art, FIGS. 3A and 3B illustrate further details of the types of components which may suitably be employed in typical transmitters and receivers which may be used in conjunction with the present invention.

FIG. 3A shows a transmitter 160 which may suitably be employed in the present invention. The transmitter 160 includes a digital signal source 161, which includes a message signal source 162, a channel encoder 163, and an interleaver 164. Transmitter 160 further includes a carrier signal source 165, a modulator 166 with first and second inputs, an RF filter and amplifier section 167, a first transmission channel 168 which includes mixer 169 and oscillator 170, second transmission channel 171, orthogonally polarized transmitting antennas 172 and 173, and transmit matrix 174.

Message signal source 162 provides a digital data signal to the channel encoder 163. Channel encoder 163 applies an error control coding technique or a channel coding technique to the data signal and outputs a coded signal.

The error control coding technique applied by channel encoder 163 may suitably be the 2D 12-DPSK code of Table VII of the above referenced Wei article. In the case of a digital mobile radio system in accordance with the invention, the input data rate to the channel encoder may range from 32 to 128 kilobits/second ("kbps"). The interleaver may suitably be a block interleaver and the modulation scheme as discussed below may be differential quadrature phase shift keyed ("DQPSK"). Additional induced channel variations are introduced by small carrier frequency offsets using mixer 169 and oscillator 170. Suppose $f_1$ is the carrier frequency transmitted from antenna 172. Then, $f_1=f_c+\Delta f$. In this case, $f_c$ is the carrier frequency of the signal transmitted by antenna 173 and $\Delta f$ is the frequency offset at transmitting antenna 172. This fixed frequency offset should be typically in the range of 1–2% of the data symbol rate. Smaller frequency offsets will not sufficiently decorrelate the fading of the received signal over the interleaver length at the input to the channel decoder at the receiver. On the other hand, larger frequency offsets will make the demodulation and the equalization functions more difficult.

The interleaver 164 is provided to rearrange the data of the coded signal in a pseudorandom fashion. The output of interleaver 164 is provided as an input to the second input of the modulator 166. A second signal, a carrier signal, is provided as an input to the first input of modulator 166. A modulated carrier signal is produced at the output of the modulator 166.

The modulated carrier signal is input to the RF filter and amplifier section 167. In section 167, filters shape the spectrum of the modulated carrier signal and amplifiers increase the signal strength to an appropriate level for transmission. The level of amplification may be controlled by a processor such as the processor 111 of FIG. 3. A filtered and amplified signal is produced at the output of the RF filter and amplifier section 167 and applied to the input of the transmit matrix 174 which may be employed to combine the signal with other signals to be transmitted and adjust the phase and amplitude of the signals to each antenna. Outputs of transmit matrix 174 are supplied to the two transmission channels, 168 and 171. The filtered and amplified signal as adjusted by the transmit matrix 174 is thus input to both antenna 173 and mixer 169. The oscillator 170 and mixer 169 apply a time varying phase offset to the signal applied to the input of the mixer 169. An offset signal is the resultant output signal from the mixer 169. The signal and offset signal are applied for transmission to the antennas 172 and 173, respectively. The antennas 172 and 173 may be helical antennas. With this arrangement, the antenna 172 transmits a right hand circularly polarized signal and antenna 173 transmits a left hand circularly polarized signal.

FIG. 3B illustrates a receiver section 180 which is suitable for use with the transmitter 160 of FIG. 3A. The receiver section 180 includes receiving antennas 181 and 182, weighting circuitry 183, an RF filter and amplifier section 184, a demodulator 185, and equalizer 186, a deinterleaver 187, and a channel decoder 188.

Each of the antennas 181 and 182 receives a combined signal consisting of the addition of the signals transmitted by antennas 172 and 173, after their transmission through various multipaths, and after modification by noise, delay, and distortion. The received signals are combined in the weighting circuitry 183 whose output becomes the input of the RF filter and amplifier section 184. In section 184, RF filters reduce noise and amplifiers increase the received signal strength. The output of the RF filter and amplifier section 184 is then applied to the demodulator 185 which demodulates the signal. The output of demodulator 185 is applied to the equalizer 186 which helps to reduce any amplitude and delay distortion. The output of equalizer 186 is applied to the deinterleaver 187 which is used to rearrange data symbols to undo the process of interleaving which occurred in the interleaver 164 in the transmitter 160. The output of the deinterleaver 164 is applied to a channel decoder 188 which derives the original data message signal, and produces that signal at its output. As addressed above, a feedback signal $\hat{x}(k)$ not shown, along with the detected data $\hat{s}(k)$, is used to adaptively control the receiver 180.

Figure 3C:
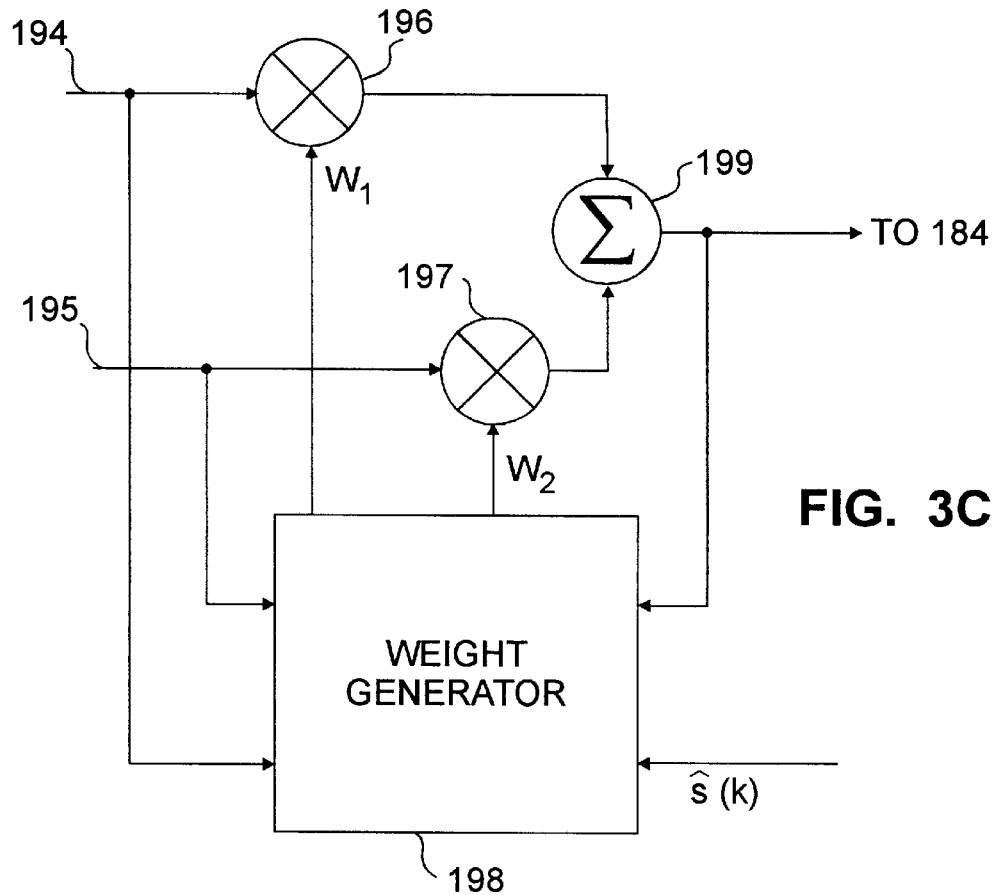
FIG. 3C illustrates further details of a weighting circuit which may suitably be employed in the receiver of FIG. 3B.

Further details of the weighting circuitry 183 are illustrated in FIG. 3C. The circuitry 183 receives as inputs on input lines 194 and 195, the signals received by the antennas 181 and 182, respectively. These received signals are fed in turn to mixers 196 and 197, as well as to a weight generator 198. The weight generator produces weighting signals $W_1$ and $W_2$ which are fed to the mixers 196 and 197, respectively. The outputs of the mixers 196 and 197 are fed to a summing circuit 199 which produces an output signal which is fed to the RF and amplifier section 184. This output from summing circuit 199 is also fed as an input to the weight generator 198, as is the received signal $\hat{s}(k)$. Further details regarding weighting may be found in the first Winters paper cited above, "The Impact of Antenna Diversity on the Capacity of Wireless Communication Systems".

Turning to various aspects of the operation of the system 100, with the M transmit antennas $112_1 \ldots 112_m$ and M receive antennas $120_1 \ldots 120_m$, an M-fold capacity increase, with spatial and/or polarization isolation of the channels in a single frequency channel, can be provided. Diversity gain is provided as follows. With a slow fading environment, feedback from the mobile 103 to the base station 101 can be used to change the data rate or the power of channels depending on the channel characteristics, and thereby obtain some diversity gain. Also with transmit diversity with offset, slow fading can be converted to periodic fast fading, and then fast fading codes can be employed in a known manner to achieve additional diversity. The feedback signal $\hat{x}(k)$ can also be used to allow the received signals to be properly weighted in view of the channel characteristics tracked by the matrix 130 and processor 131. This result follows because, in a slow fading environment, the rapid fading created by transmit diversity with frequency offset is predictable up to the slow fading rate of change.

As discussed further below, it is only necessary to know the range of received channel characteristic and the characteristic at two points in time to determine the received channel over all time. Thus, although the channels would be changing at the fast fading rate, feedback need only occur at the slow fading rate.

With fast fading, such as that illustrated in FIG. 1, feedback from the mobile 103 to the base station 101 may no longer be useful because of propagation delay, and thus it may not be possible to optimize the data rate or power of the transmitted signals. In this instance, however, coding can be satisfactorily used to obtain diversity gain. Thus, a combination of the two approaches should cover all cases. By determining the fading rate at the mobile 103 and feeding the information back, an adaptive system is provided in which the appropriate transmission approach is chosen.

An example will serve to illustrate that the present invention should make it readily possible to increase a 64 kbps data transmission rate in a 30 kHz channel to 128 kbps. While this example is given in the context of narrow-band cellular radio in which the carrier frequency is around 900 MHz, and the signal bandwidth is on the order of a few tens of kHz and is preferably 30 kHz, it will be recognized that the present invention is more generally applicable to solving problems involving fading channels.

The proposed North American standard for digital mobile radio, IS-54, a cellular ("TDMA") system in which 3 remotes communicate with a base station in each 30 kHz channel within a 824 to 849 mHz (mobile to base) and 869–894 mHz (base to mobile) frequency range, at a data rate of 13 kbps per user using differential quadrature phase shift keyed ("DQPSK") modulation. Each user's slot contains 324 bits, including a 28 bit synchronization sequence, plus 260 data bits, resulting in a data rate for each channel of 48.6 kbps or 24.3 kbaud.

The example considers both slow and fast fading with an assumed bit error rate ("BER") requirement of $10^{-4}$. For fast fading, this is the BER averaged over the fading. For slow fading, a $10^{-3}$ outage propability with a $10^{-4}$ BER is assumed. Since 128 kbps in a 30 kHz channel requires a bandwidth efficiency of greater than 4.26 bits/symbol, which is higher than typical codes such as those described in Wei, "Coded M-DPSK with Built-in Time Diversity for Fading Channels"cited above, the example considers at least two channels or $M \geq 2$.

For the slow fading environment, antenna arrays with a nonfading code and feedback between the mobile and the base station is provided. FIG. 8 of Winters, "On the Capacity of Radio Communication Systems With Diversity in a Rayleigh Fading Environment" cited above shows that the required efficiency index of 2.13 bits/cycle per channel with 2 channels requires a received signal-to-noise ratio, p, of 27, 18, and 12 dB, with 2, 4, and 8 receive antennas, $M_r$, respectively, and 2 transmit antennas, $M_t$. It is noted that without feedback, or in other words, with only linear processing at the receiver, FIG. 7 of Winters shows that an efficiency index of 2.13 bits/cycle per channel with 2 channels using $M_1=2$ is not practical with $M_r=2$, and requires p=25 and 14 dB for $M_r=4$ and 8, respectively. Alternatively, 4 channels with an efficiency index per channel of 1.07 bits/cycle requires p=12 dB with $M_1=M_r=4$.

For the fading code, our example addresses the 2D 12-DPSK code of Table VII in Wei, although other codes may be suitably employed. The exemplary code has an efficiency of 2.5 bits/symbol, which allows for reasonable excess bandwidth for the required 2.13 bits/cycle with 2 channels. For this code, FIG. 20 of Wei shows that, with fast fading such as with a mobile in a vehicle traveling at a speed of 60 mph, p=13.5 and 22 dB for a $10^{-4}$ BER with and without dual receive antenna diversity, respectively. In slow fading environments, since this code has a built-in time diversity of 2, dual transmit diversity with frequency offset should permit the full predicted coding gains both with and without receive diversity. Thus, using this fading code in a slow-fading environment, with transmit diversity with frequency offset and no feedback, the required p should be 22 dB with $M_t=M_r=2$. With feedback with fading prediction, the required p should be much lower as shown above for the nonfading code.

For fast fading environments, our example again considers the 2D 12-DPSK code. From before, with $M_t=2$, p=13.5 and 22 dB with $M_r=2$ and 3, respectively.

The above described techniques illustrate how the present invention may be employed to obtain high data rates in analog mobile phone system ("AMPS") channels by using joint antenna diversity with offsets and coding in conjunction with feedback. The example illustrates the feasibility of these techniques for obtaining 128 kbps in a 30 kHz channel.

Figure 4:
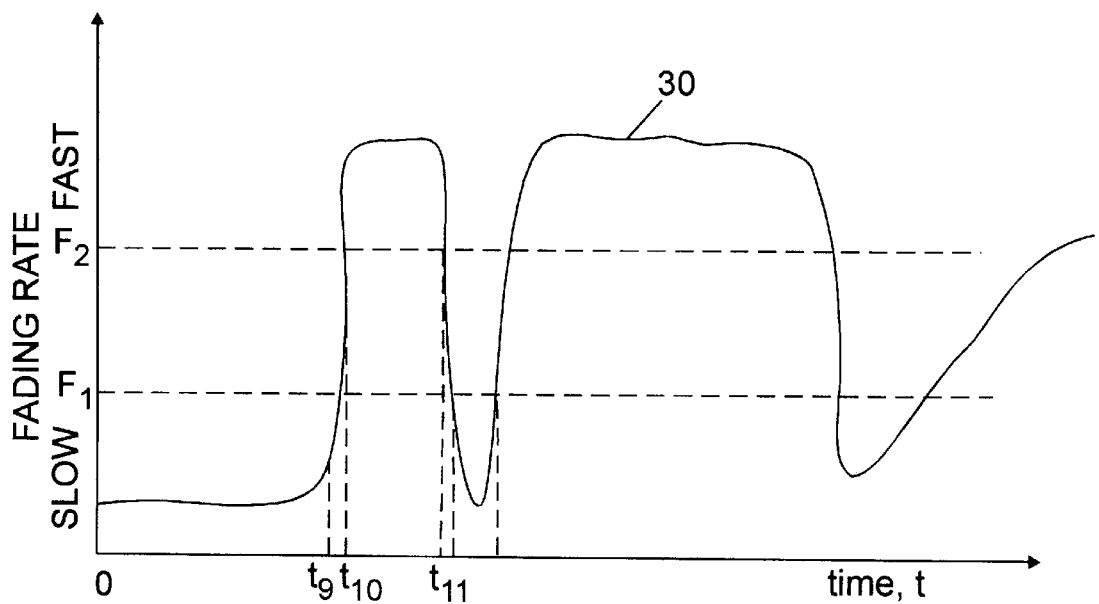
FIG. 4 is a graph illustrating a time variation of channel fading from slow to fast versus time.

Other aspects of a process 200 in accordance with teachings of the present invention are described in conjunction with FIGS. 4 and 5 below. FIG. 4 illustrates a fading channel 30 which varies with time. From time, t=0, to time $t=t_9$, the fading rate 30 has a value less than a first threshold value $F_1$ which may be characterized as slow fading. At time $t>t_9$, the signal 30 increases above the threshold $F_1$ so that fast fading is observed. At time $t=t_{10}$, a second threshold $F_2$ is reached and thereafter soon exceeded. As discussed further below, at this threshold offsets such as the offsets $f_1(t) \ldots f_M(t)$ of FIG. 3 are preferably turned off.

Figure 5:
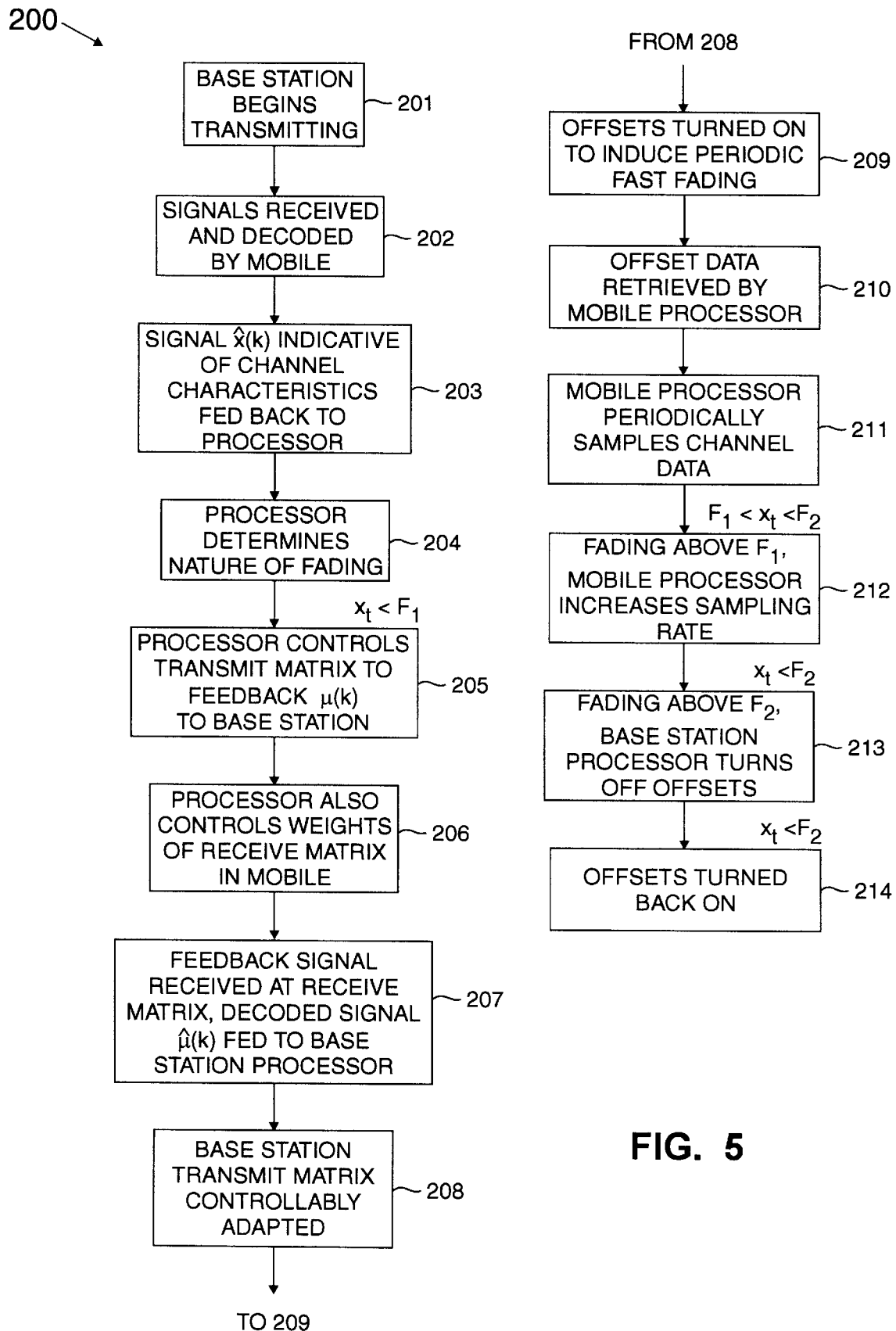
FIG. 5 is a flowchart that illustrates a process in accordance with the present invention.

Starting at time t=0, it is assumed that the base station 101 of FIG. 3 starts transmitting, as shown in block 201 of the flowchart of FIG. 5 which illustrates the process 200. Signals are received at the mobile 103 by the antennas $120_1 \ldots 120_m$, demodulated and decoded by the matrix 130, as illustrated in step 202. The signal $\hat{x}(k)$ indicative of characteristics of the communication channels 102 is fed back to the processor 131 in step 203. For this example and simplicity of discussion, it is assumed that each of the channels 102 exhibits fading rates approximating that shown in FIG. 4. In step 204, the processor determines from the signal $\hat{x}(k)$ whether the fading signals $x_t$ for the channels 102 are: $x_t<F_1$, $F_1<x_t<F_2$ or $x_t>F_2$. In this case, $x_t<F_1$ and the processor determines that the channels exhibit slow fading. As a result, in step 205, the processor 131 controls the transmit matrix 140 to feed back the signal u(k) indicating that slow fading is occurring. The processor 131 also controls the adjustment of the weights of the receive matrix 130 to match the measured fading characteristic in step 206. In step 207, the signal û(k) is received at the receive matrix 150 of the base station and the decoded signal û(k) is fed to the processor 111 and the modulator transmit matrix 110 is adjusted to match the channel in step 208. In step 209, the offsets $f_1(t) \ldots f_m(t)$ are also turned on by the processor 111. These offsets convert the measured slow fading into induced periodic fading.

In step 210, the offsets $f_1(t) \ldots f_M(t)$ or offset related information, are retrieved by the processor 131, and in step 211, the processor 131 periodically samples the channel data based upon the stored offset information. In step 212, the processor 131 at time $t>t_9$ determines that the fading signal 30 is above the threshold $F_1$ and the sampling rate is increased to a faster rate suitable for detecting fast fading. At time $t>t_{10}$, the fading signal 30 is above the threshold $F_2$. As the effect of the offsets is to induce faster fading, it is desirable to turn off the offsets above the threshold $F_2$, and this is done in step 213. Between the thresholds $F_1$ and $F_2$, although the observed fading is fast, the offsets can be left on as the increased speed of fading induced thereby is not so fast as to create any processing problems. Finally, in step 214, at time $t>t_{11}$, the fading signal 30 is below the higher threshold $F_2$ and the offsets are turned back on.

While details of the present invention have been disclosed in the presently preferred context of high data rate transmission in narrowband mobile radio channels, it will be apparent to those of ordinary skill in the art that the teachings of the present invention can be variously adapted to suit other design environments and evolving technologies to which they may become readily applicable in the future.

We claim:

1. An adaptive high speed data transmission system suitable for use in both fast and slow fading communications channels, said system employing joint antenna diversity with frequency offsets, coding and feedback, said system comprising:
   a base station having a transmitter having:
      (i) a plurality of transmit antennas, at least one transmit antenna having a controllable frequency offset adapted to convert a fading characteristic of at least one transmission channel from slow fading to periodic fast fading;
      (ii) a signal coding unit; and
      (iii) a transmitter processor for adaptively controlling operation of the transmitter; and
   a mobile unit having a receiver having:
      (i) a plurality of receive antennas;
      (ii) a signal decoding unit; and
      (iii) a receiver processor for adaptively controlling operation of the receiver and monitoring a fading characteristic of a plurality of transmission channels including said at least one transmission channel between the transmitter and the receiver.

2. The apparatus of claim 1, wherein the signal decoding unit further comprises a weighting matrix for combining signals received by the plurality of receive antennas.

3. The apparatus of claim 1, wherein the mobile unit further comprises a transmitter and the base station further comprises a receiver and the transmitter of the mobile unit sends a feedback signal indicative of the fading characteristics of the plurality of transmission channels to the receiver of the base station.

4. The apparatus of claim 1, wherein the transmitter of the base station further comprises an equalizer circuit.

5. An adaptive high speed data transmission method suitable for use in both fast and slow fading communications channels, said method employing joint antenna diversity with frequency offsets, coding and feedback, said method comprising:
   coding a signal to be transmitted from a base station transmitter utilizing a signal coding unit;
   transmitting the coded signal utilizing a plurality of transmit antennas and applying a controllable frequency offset adapted to convert a fading characteristic of at least one transmission channel from slow fading to periodic fast fading to at least one of said plurality of transmit antennas;
   receiving the transmitted signal at a mobile unit receiver utilizing a plurality of receive antennas;
   decoding the received signal utilizing a signal decoding unit;
   monitoring a fading characteristic of a plurality of transmission channels including said at least one transmission channel between the plurality of transmit antennas and the plurality of receive antennas; and
   adaptively controlling the transmitter and receiver operation based upon the results of said step of monitoring a fading characteristic.

6. The method of claim 5 further comprising the step of combining signals received by the plurality of receive antennas utilizing a weighting matrix.

7. The method of claim 5 further comprising the step of sending a feedback signal indicative of the fading characteristics of the plurality of transmission channels from the mobile to the base station.

8. A method for periodically sampling a periodic induced fast fading characteristic comprising the steps of:
   detecting a slow fading characteristic below a first threshold;
   inducing the periodic fast fading characteristic by employing multiple transmit antennas and a known frequency offset with at least one of said multiple transmit antennas; and
   utilizing knowledge of the frequency offset to determine a suitable periodic rate for sampling said periodic fast fading characteristic, said suitable periodic rate being fast enough to detect changes in said slow fading characteristic above a second threshold.

9. An adaptive high speed data transmission system suitable for use in both fast and slow fading communications channels, said system employing joint antenna diversity with frequency offsets, coding and feedback, said system comprising:
   a base station having a transmitter having:
      (i) a plurality of transmit antennas, at least one transmit antenna having a controllable frequency offset;
      (ii) a signal coding unit; and
      (iii) a transmitter processor for adaptively controlling operation of the transmitter; and
   a mobile unit having a receiver having:
      (i) a plurality of receive antennas;
      (ii) a signal decoding unit, the signal decoding unit further comprising a weighting matrix for combining signals received by the plurality or receive antennas; and
      (iii) a receiver processor for adaptively controlling operation of the receiver and monitoring a fading characteristic of a plurality of transmission channels between the transmitter and the receiver, the receiver further comprising a memory connected to the receiver processor for storing information concerning the controllable offset of said at least one transmit antenna.

10. The apparatus of claim 9, wherein the receiver processor utilizes the information concerning the controllable offsets to periodically sample the fading characteristics of the plurality of transmission channels.

11. The apparatus of claim 10, wherein the processor utilizes its periodically sampled samples of the fading characteristics to control adjustments of weightings in the weighting matrix.

12. An adaptive high speed data transmission system suitable for use in both fast and slow fading communications channels, said system employing joint antenna diversity with frequency offsets, coding and feedback, said system comprising:
   a base station having a transmitter having:
      (i) a plurality of transmit antennas, at least one transmit antenna having a controllable frequency offset;
      (ii) a signal coding unit; and
      (iii) a transmitter processor for adaptively controlling operation of the transmitter; and
   a mobile unit having a receiver having:
      (i) a plurality of receive antennas;
      (ii) a signal decoding unit; and
      (iii) a receiver processor for adaptively controlling operation of the receiver and monitoring a fading characteristic of a plurality of transmission channels between the transmitter and the receiver, wherein the mobile unit further comprises a transmitter and the base station further comprises a receiver and the transmitter of the mobile unit sends a feedback signal indicative of the fading characteristics of the plurality of transmission channels to the receiver of the base station, and wherein the base station processor controls said controllable offset to turn it off if the fading characteristics are faster than a first threshold.

13. An adaptive high speed data transmission method suitable for use in both fast and slow fading communications channels, said method employing joint antenna diversity with frequency offsets, coding and feedback, said method comprising:

coding a signal to be transmitted from a base station transmitter utilizing a signal coding unit;

storing information concerning the controllable offset of at least one of a plurality of transmit antennas;

transmitting the coded signal utilizing the plurality of transmit antennas and applying the controllable frequency offset to at least one of said plurality of transmit antennas;

receiving the transmitted signal at a mobile unit receiver utilizing a plurality of receive antennas;

combining signals received by the plurality of receive antennas utilizing a weighting matrix;

decoding the received signal utilizing a signal decoding unit;

monitoring a fading characteristic of a plurality of transmission channels between the plurality of transmit antennas and the plurality of receive antennas; and adaptively controlling the transmitter and receiver operation based upon the results of said step of monitoring a fading characteristic.

14. The method of claim 13 further comprising the step of utilizing the stored offset information to determine a periodic sample rate to sample the fading characteristics of the plurality of transmission channels.

15. The method of claim 14 further comprising the steps of sampling the fading characteristics at said determined periodic rate and utilizing the samples generated thereby to control said weighting matrix.

16. An adaptive high speed data transmission method suitable for use in both fast and slow fading communications channels, said method employing joint antenna diversity with frequency offsets, coding and feedback, said method comprising:

coding a signal to be transmitted from a base station transmitter utilizing a signal coding unit;

transmitting the coded signal utilizing a plurality of transmit antennas and applying a controllable frequency offset to at least one of said plurality of transmit antennas;

receiving the transmitted signal at a mobile unit receiver utilizing a plurality of receive antennas;

decoding the received signal utilizing a signal decoding unit;

monitoring a fading characteristic of a plurality of transmission channels between the plurality of transmit antennas and the plurality of receive antennas;

sending a feedback signal indicative of the fading characteristics of the plurality of transmission channels from the mobile to the base station;

determining if the fading characteristics are faster than a first threshold and ceasing said step of applying a controllable offset if it is determined that the fading characteristics are faster than a first threshold; and adaptively controlling the transmitter and receiver operation based upon the results of said step of monitoring a fading characteristic.

* * * * *